UNITED STATES PATENT OFFICE.

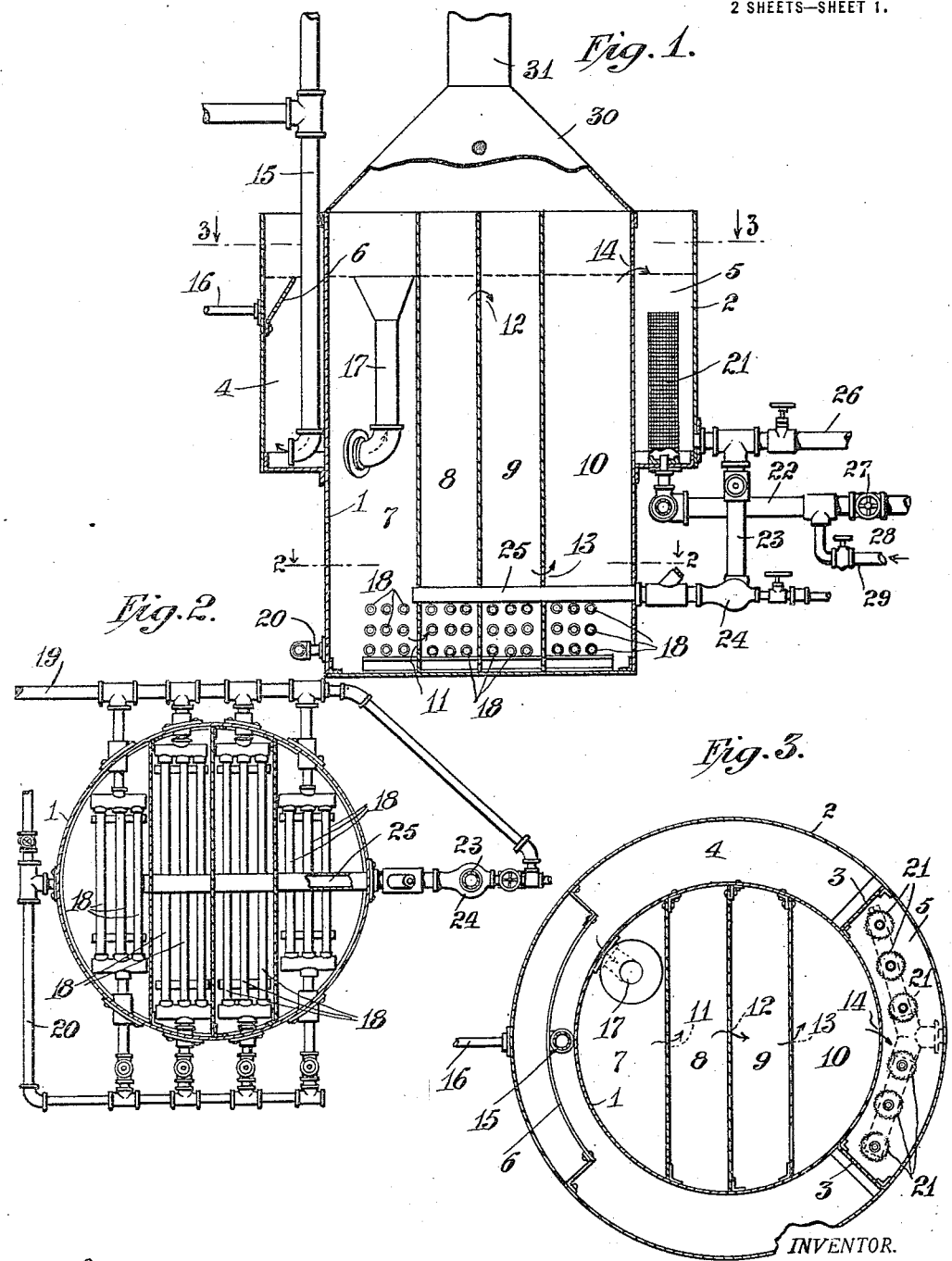

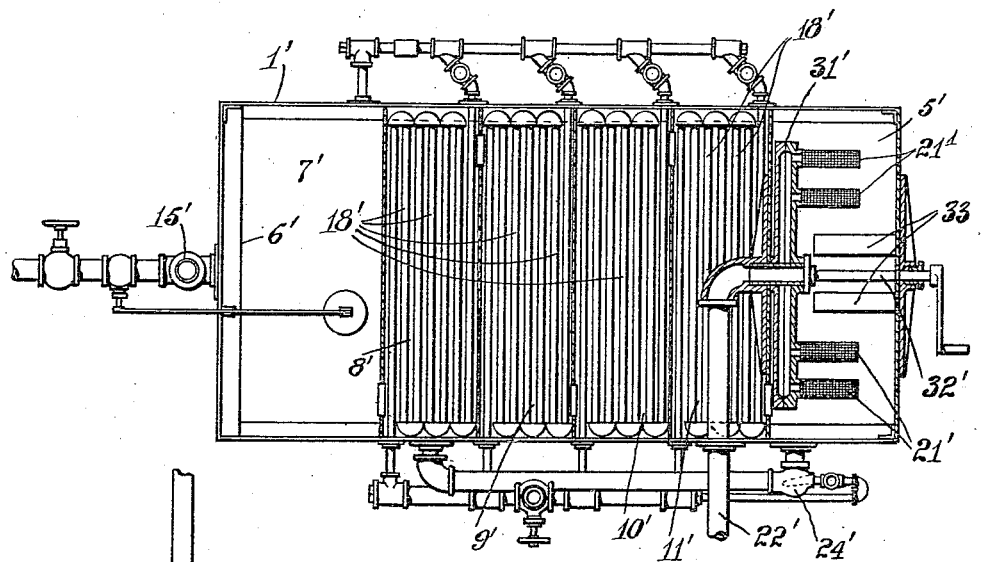
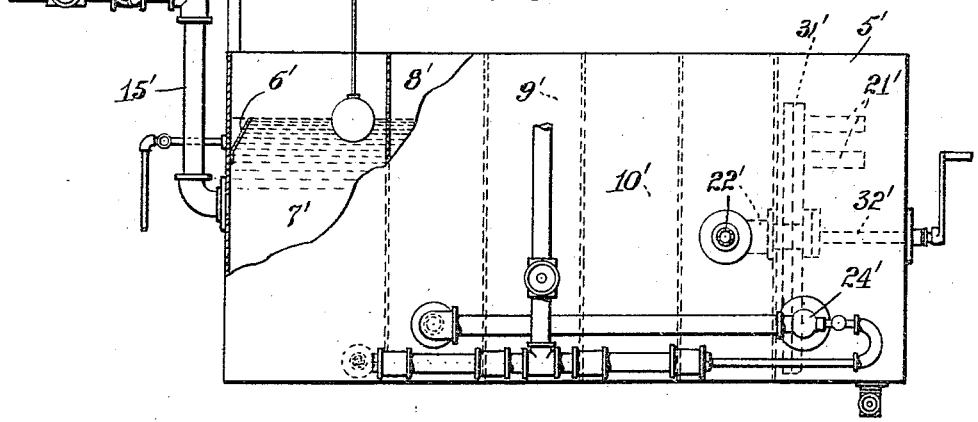

ARTHUR E. KRAUSE, OF JERSEY CITY, NEW JERSEY.

REBOILER AND CONDENSATE-PURIFIER.

1,265,678. Specification of Letters Patent. Patented May 7, 1918.

Application filed March 3, 1917. Serial No. 152,204.

*To all whom it may concern:*

Be it known that I, ARTHUR E. KRAUSE, a citizen of the United States of America, and a resident of Jersey City, in the county of Hudson and State of New Jersey, have invented a certain new and useful Reboiler and Condensate-Purifier, of which the following is a specification.

My invention relates to an apparatus for removing oil and grease and the like from water of condensation and for reboiling the water; and is particularly intended for the supply of water for ice making, though adaptable for other uses, as for example, for the purification of boiler feed water in power plants using condensing engines or turbines.

In the making of artificial ice, it is common to use for the water to be frozen, the condensed exhaust of the various steam engines and pumps of the plant; in some cases, water from other sources being added to the condensate. Such condensate commonly contains more or less oil or grease, derived from the lubricating oil supplied to the engines, and attempt is usually made to remove such oil or grease by "skimming." In addition, the water of condensation usually contains more or less so-called "foul gas", and even water distilled in evaporators is apt to contain more or less of this foul gas; hence it is the custom to subject the water to be used in ice making to so-called "reboiling", *i. e.*, heating to or near the boiling point in an open-topped vessel, the effect of this heating being to drive off such foul gas, also air which may be dissolved in the water and which, if frozen into the ice, might make the ice cloudy, or might result in the formation of air bubbles in the ice—such air bubbles, if present in any considerable quantity, detracting somewhat from the saleability of the ice.

Skimming water of condensation to remove the oil, does not, as a rule, remove all of the oil; nor does the reboiling. There are known processes, involving agitation in the water of substances, such as magnesium silicate in the form of so-called asbestic, serpentine sand, etc., (substances having a selective attraction for the oil) by which practically all of the oil in the water may be removed; but these substances are commonly soluble in water, though to a very slight degree; yet, owing to the tendency of substances in suspension or in solution in water which is freezing, to be thrown out during the freezing, even the slight amount of magnesium silicate or other oil removing substance which may be dissolved by the water, tends to collect at the center of the ice cake, forming a cloudy layer at the center; and this cloudy layer, though absolutely harmless, is not desired by ice users.

I have discovered that if water containing such slight traces of oil removing substances, such as the magnesium silicates mentioned, be subjected to a heating action similar to the reboiling action to which water to be frozen is ordinarily subjected, the proportion of such magnesium silicate or other oil removing substance which may be dissolved in the water, is very greatly decreased; and I have further discovered that the violent agitation of the water incident to its reboiling, constitutes convenient means for the thorough admixture with the water of the oil removing substance. In the apparatus herein described, I therefore combine the operation of agitating the water with an oil removing material, with the reboiling action; thereby at once in one operation accomplishing separation of the oil from the water, the reboiling of the water to drive off air and foul gas, and the heating of the water to reduce to a minimum the proportion of oil removing material which may be carried off in solution of the water. I have further discovered that when the oil absorbing material is brought into contact with the water in a finely divided or fluffy condition, then, owing to the very large contact surface offered by such fluffy material in proportion to its bulk, a very much smaller weight of such oil absorbing material is required, to remove the oil suspended in the water, than if such oil absorbing material be not in the finely divided or fluffy condition referred to; and I find that, owing to such smaller weight of the absorbing material required, when that absorbing material is in the fluffy condition, a smaller proportion of such absorbent material is dissolved in the water.

I further find that the heating of the water while being agitated in admixture with the absorbing material, tends to drive off air and other gases present in the absorbing material, so avoiding presence of air in suspension in the absorbing material, which air, if it remain within the pores or interstices of the absorbing material, would tend to keep that absorbing material nearer the surface of the water than is desirable. The agitation of the water by the steam arising therein is in itself an amply sufficient means for maintaining the absorbing material in proper suspension in the water; the further action of air, tending to hold that absorbing material in suspension, is not desired, and particularly is not desirable in the filtering chamber, where, if such absorbing material remain in suspension it tends to clog the filter unnecessarily.

I further, preferably, provide the apparatus with a skimmer, and also provide it with a filter which will prevent the outflowing water from carrying with it, in suspension, the oil removing material; and I further preferably provide the apparatus with means for continuously returning, from the filtering portion of the apparatus, such of the oil removing material as may be carried over into the filtering portion of the apparatus; and in the operation of the apparatus I so return the oil removing material until it has become saturated with oil to such an extent that it is not desirable to return that material longer; in which case the oil saturated material is run off to waste and fresh oil removing material is charged into the apparatus.

My invention therefore comprises means for effecting reboiling, oil removal, and reduction of solvent action, at one time and with one application of heat; other features of my invention will be pointed out hereinafter.

The objects of my invention are to economize in the use of heat in the reboiling and oil removal treatment of water, particularly water to be used for ice making; to reduce to the lowest possible degree solution of the oil removing material in the water treated; to provide simple and effective means for the return to the water-treatment portion of the apparatus, of such of the oil removing material as may be carried from that portion of the apparatus with the outflowing water; and to make the apparatus simple, effective and easy of operation.

I will now proceed to describe my invention with reference to the accompanying drawings and will then point out the novel features in claims. In said drawings:

Figure 1 shows a central vertical section of one form of apparatus embodying my invention.

Fig. 2 shows a horizontal section of that apparatus on the line 2—2 of Fig. 1.

Fig. 3 shows a horizontal section of the said apparatus, on line 3—3 of Fig. 1.

Fig. 4 shows a top view and Fig. 5 shows a side elevation and partial vertical section of an alternative form of my apparatus.

Referring first to Figs. 1, 2 and 3. 1 designates a suitable cylindrical tank open at the top, and provided with an annular jacket 2 surrounding the upper portion of this tank. As indicated particularly in Fig. 3, this jacket space is divided, by partitions 3, into chambers 4 and 5, of which 4 is a skimming chamber and 5 is a filter chamber; and the skimming chamber is commonly provided with a skimmer-partition 6. The interior of the main chamber 1 is divided, by vertical partitions (three in the particular construction shown, but the number may be less or greater as desired) into a number of chambers 7, 8, 9 and 10; suitable openings or ports 11, 12 and 13 being provided in said partitions so that the water in the bottom of chamber 7 may flow up through chamber 8 and thence into chamber 9 and down through that chamber into chamber 10. A further port 14 is provided through which water may flow from chamber 10 into the filter chamber 5. 15 designates a pipe through which water may enter the apparatus. This pipe commonly extends to near the bottom of the skimming chamber 4. The water so admitted will rise to near the level of the top of the skimmer partition 6, the oil carried by such water rising, on the surface of the water, and floating over the top of the skimmer partition into the space inclosed by that skimmer partition and thence passing out through the skimmer discharge pipe 16. In this way a large portion, but not usually all, of the floating oil may be removed. The water in the skimming chamber 4 with the remaining emulsified and other oil mingled with it passes through a pipe 17 to the top of said pipe which is at the water level of the apparatus, and overflows into the chamber 7, thence passing, in turn, through chambers 8, 9 and 10 and thence into the filter chamber 5. In the lower portion of the vessel 1 there are heating pipes 18 for supplying heat to the water in said vessel 1. Through these pipes steam or any other suitable heating fluid may be circulated. Steam will commonly be used for such heating fluid, and the steam so used will be supplied through a pipe 19, and will be condensed in the heating pipes 18, the condensate being delivered through pipe 20 into chamber 7.

The oil removing material (which may be of any suitable character, pulverulent, fibrous or flocculent) will ordinarily be placed, initially in chamber 7. The ebullition of the water, due to the heating by pipes 18 in this chamber 7, will result in thorough mixture of such oil removing material with the water; and as the water flows from chamber 7 to chamber 8, this oil removing material will pass in large measure into chamber 8, and thence, in turn, to chamber 9, to chamber 10 and finally to the filtering chamber 5. In these several chambers 7, 8, 9 and 10, the reboiling action will occur, by reason of the ebullition above referred to, as well as the thorough admixture of the oil removing material with the water; and owing to the high temperature of the water, resulting from the heat imparted to it by the coils 18, the solution of the oil removing material in the water will be reduced to a minimum.

In the filtering chamber 5 I have shown a number of ordinary bag filters 21 connected to an outflow pipe 22. These filters will remove from the water all of the solid matter in suspension therein, including the oil removing material, more or less charged with oil, which has been carried with the water into chamber 5. This oil removing material will collect on the filter surfaces and also, in larger measure, at the bottom of the filtering chamber, and may be withdrawn from that filtering chamber through a pipe 23 connected to a steam-operated injector 24, by which injector such solid material, in suspension in a portion of the water withdrawn from filter chamber 5, will be returned through a pipe 25 to chamber 7, and there will act over again. The pipe 23 is provided with a waste connection 26 whereby when desired the filter chamber 5 may be emptied, or saturated absorbent material drawn off. Pipe 22 may be provided with a shutoff valve 27, also with another valve, 28, by which water or steam or other suitable fluid, derived from a pipe 29, may be flowed, in reverse direction, through the filters 21, to clean them.

When desired the tank 1 may be provided with a hood 30, having a suitable outlet stack 31 through which hood and stack gases driven off from the water may be carried away.

In Figs. 4 and 5 I show an alternative form of apparatus which is, in general, the same in principle as the apparatus shown in Figs. 1–3 inclusive, but is of rectangular form. The same reference numerals, primed, are employed, as are employed for corresponding parts in Figs. 1, 2 and 3.

One feature in which the apparatus shown in Figs. 4 and 5 differs from that shown in Figs. 1–3 inclusive is in the means for cleaning the bag filters designated in Figs. 4 and 5 by numeral 21'. These bag filters are mounted upon a hollow disk member connected to the clear water outlet 22"; and said disk member 31 is arranged to be rotated by a shaft 32; whereby, the bag filters being dragged through the water with some velocity, deposit clinging to them is washed off. Baffles 33 tend to prevent the water from rotating with the filters.

As means for preventing the slight trace of a magnesium compound or other material derived from the oil separating material, which may remain in suspension in the water withdrawn, from causing cloudiness in the ice formed from that water, I may add to the water a small proportion of citric acid (about one-hundredth of one per cent.) which will turn the carbonate of magnesium into citrate of magnesia, and also, if the water contains carbonate of lime, will turn that carbonate of lime into citrate of lime.

Because of the extremely thorough admixture of the oil separating or absorbing material, with the water, due to the violent ebullition incident to reboiling, I find that a very small proportion of such oil absorbing or oil removing material is required, as compared with the amount which would be required for treatment of a similar quantity and quality of water if the treatment were conducted without such thorough agitation. It seems probable, in addition, that the separation of the oil is effected more readily by the said absorbent material at or near the boiling temperature of the water, than at lower temperatures; and further, the proportion of the absorbent material which is dissolved in the water is very much less, when that water is near the boiling point, than when the water is at a much lower temperature. Furthermore, when the absorbing material is mixed with the water, without reboiling, and then is separated from the water by filtration, the time required for the filtration is so great that opportunity is afforded for solution of a relatively large proportion of the absorbent material in the water; whereas, when the treatment of the water with the oil removing material is conducted at the same time as the reboiling, the time of contact of the absorbent material with the water may be so short, due to the temperature at which the treatment occurs, and also due to the extremely thorough admixture of the absorbing material with the water, effected by the reboiling, that the time available for solution of the absorbent material in the water is relatively small, and the proportion of such material so dissolved in the water is further reduced by the fact that a relatively small proportion of oil absorbent material is required.

In a divisional application, Serial No. 216,342, filed February 9, 1918, I have claimed the method of treating water herein described.

What I claim is:

1. Apparatus such as described comprising a container divided into a plurality of chambers connected for flow of water therethrough, means for supplying heat to water in such container, means for the removal from the water of solid material in suspension in such water in a late chamber of the series, and means for the return to an early chamber of the series of material in suspension so removed.

2. Apparatus such as described comprising a container divided into a plurality of chambers connected for flow of water therethrough, means for supplying heat to water in such container, means for the removal from the water of solid material in suspension in such water in a late chamber of the series, a return connection for the solid material so separated, leading to an early chamber of the series, and means for inducing flow in such return connection.

3. Apparatus such as described comprising a container having within it a plurality of ported partitions dividing said container into a plurality of chambers connected for the flow of water therethrough, heating coils in certain of said chambers, means for the removal from the water of solid material in suspension in such water in a late chamber of the series, and means for the return to an early chamber of the series, of material in suspension so removed.

4. Apparatus such as described comprising a container having a plurality of ported partitions dividing it into a series of chambers connected for the flow of water therethrough, a jacket surrounding said container and itself divided into a plurality of chambers one of said jacket chambers connected to an early chamber of the series, the other of said jacket chambers connected to a late chamber of the series, means for the transfer of water from said first jacket chamber to an early chamber of the container series, means in the other jacket chamber for the removal from the water of solid material in suspension in such water, and means for the return to an early chamber of the series of material in suspension so removed.

5. Apparatus such as described comprising a container having a plurality of ported partitions dividing it into a series of chambers connected for the flow of water therethrough, a jacket surrounding said container and itself divided into a plurality of chambers, one of said jacket chambers connected to an early chamber of the series, the other of said jacket chambers connected to a late chamber of the series, a skimmer in the first of said jacket chambers, means for the transfer of water from said first jacket chamber to an early chamber of the container series, means in the other jacket chamber for the removal from the water of solid material in suspension in such water, and means for the return to an early chamber of the series of material in suspension so removed.

In testimony whereof I have signed this specification in the presence of two subscribing witnesses.

ARTHUR E. KRAUSE.

Witnesses:
H. M. MARBLE,
PAUL H. FRANKE.

Copies of this patent may be obtained for five cents each, by addressing the "Commissioner of Patents, Washington, D. C."